US012634617B2

(12) United States Patent
Wu

(10) Patent No.: US 12,634,617 B2
(45) Date of Patent: May 19, 2026

(54) EARPHONE

(71) Applicant: SHENZHEN COGITATION TECHNOLOGY CO., LTD, Nanshan District Shenzhen (CN)

(72) Inventor: Jifeng Wu, Nanshan District Shenzhen (CN)

(73) Assignee: SHENZHEN COGITATION TECHNOLOGY CO., LTD, Shenzhen (CN)

( * ) Notice: Subject to any disclaimer, the term of this patent is extended or adjusted under 35 U.S.C. 154(b) by 157 days.

(21) Appl. No.: 18/693,618

(22) PCT Filed: Sep. 22, 2022

(86) PCT No.: PCT/CN2022/120572

§ 371 (c)(1),
(2) Date: Mar. 20, 2024

(87) PCT Pub. No.: WO2023/046020

PCT Pub. Date: Mar. 30, 2023

(65) Prior Publication Data

US 2025/0142245 A1 May 1, 2025

(30) Foreign Application Priority Data

Sep. 23, 2021 (CN) .......................... 202111115149.0

(51) Int. Cl.
*H04R 1/10* (2006.01)
*H04R 1/1025* (2026.01)

(52) U.S. Cl.
CPC ......... *H04R 1/1066* (2013.01); *H04R 1/1016* (2013.01); *H04R 1/1025* (2013.01)

(58) Field of Classification Search
CPC ....... A44C 7/002; A61B 5/7405; A61F 11/08; A61F 5/02; B29C 45/167; C08J 7/046;
(Continued)

(56) References Cited

U.S. PATENT DOCUMENTS 6,057,659 A * 5/2000 Akiyama ................. H04R 5/02 381/387
6,449,374 B1 * 9/2002 Skulley .................. H04R 1/083 381/381

(Continued)

FOREIGN PATENT DOCUMENTS

CN 109104660 A 12/2018
CN 212992575 U 4/2021
CN 213938276 U 8/2021

OTHER PUBLICATIONS

International Search Report from corresponding PCT Application No. PCT/CN2022/120572, Dec. 15, 2022.

*Primary Examiner* — Gerald Gauthier
(74) *Attorney, Agent, or Firm* — Workman Nydegger

(57) ABSTRACT

An earphone includes a rear housing, an earpiece housing provided at a front end of the rear housing of the earphone, and a front portion connected to the earpiece housing. The front portion includes a support member and a liquid silicone layer wrapped around an exterior surface of the support member. An end of the liquid silicone layer extends outwardly to form an in-ear part. A sound transmission channel is formed within the front portion, so that the earpiece housing and the in-ear part are in communication with each other.

13 Claims, 3 Drawing Sheets

(58) Field of Classification Search

CPC ....... G10K 11/165; H01Q 21/29; H04M 1/04; H04R 1/10; H04R 1/1008; H04R 1/1016; H04R 1/1025; H04R 1/1033; H04R 1/1041; H04R 1/105; H04R 1/1058; H04R 1/1066; H04R 1/1075; H04R 1/1083; H04R 1/1091; H04R 3/005; H04R 5/0335; H04R 21/028; H04R 25/656; H04R 25/658; H04R 2420/07; H04R 1/028; H04R 1/083; H04R 1/30; H04R 5/02; H04R 9/06; H04R 31/00; A43B 3/50; A63F 13/2145; F16M 11/10; G01N 1/14; G01S 5/017; H04B 1/38; H04B 17/309; H04N 23/51

See application file for complete search history.

(56) References Cited

U.S. PATENT DOCUMENTS

| | | | | |
|---|---|---|---|---|
| 9,055,358 | B2 * | 6/2015 | Sato | H04R 1/028 |
| 10,219,064 | B1 * | 2/2019 | Valenzuela | H04R 1/30 |
| 2004/0107080 | A1 * | 6/2004 | Deichmann | A61F 11/08<br>703/6 |
| 2010/0246879 | A1 * | 9/2010 | Siahaan | H04R 1/1016<br>264/250 |
| 2013/0083933 | A1 * | 4/2013 | Aase | H04R 1/1041<br>381/74 |
| 2013/0127297 | A1 * | 5/2013 | Bautista | H10N 30/704<br>29/25.35 |
| 2014/0119589 | A1 * | 5/2014 | Wyzisk | H04R 1/105<br>381/380 |
| 2014/0152890 | A1 * | 6/2014 | Rayner | H04N 23/51<br>277/312 |
| 2015/0201723 | A1 * | 7/2015 | Rayner | F16M 11/10<br>224/191 |
| 2015/0237434 | A1 * | 8/2015 | Tran | H04R 1/1016<br>381/380 |
| 2016/0048209 | A1 * | 2/2016 | Park | A63F 13/2145<br>345/173 |
| 2016/0316300 | A1 * | 10/2016 | Qi | H04R 31/00 |
| 2016/0317341 | A1 * | 11/2016 | Galvan | A61F 5/02 |
| 2017/0040012 | A1 * | 2/2017 | Goldstein | G10K 11/165 |
| 2017/0210591 | A1 * | 7/2017 | Kennedy | H04R 1/1033 |
| 2017/0257695 | A1 * | 9/2017 | Smiechowski | H04R 1/1066 |
| 2017/0311069 | A1 * | 10/2017 | Prevoir | H04R 1/1058 |
| 2018/0000649 | A1 * | 1/2018 | Wang | H04R 1/1058 |
| 2018/0109862 | A1 * | 4/2018 | Lawand | H04R 25/656 |
| 2018/0124489 | A1 * | 5/2018 | Aljuwayed | H04R 1/1058 |
| 2018/0160975 | A1 * | 6/2018 | London | A43B 3/50 |
| 2018/0302708 | A1 * | 10/2018 | Monaghan | H04R 5/0335 |
| 2018/0351775 | A1 * | 12/2018 | Zhang | H04B 17/309 |
| 2019/0045306 | A1 * | 2/2019 | Palmer | H04R 9/06 |
| 2019/0069065 | A1 * | 2/2019 | Brace | H04R 1/1008 |
| 2019/0158340 | A1 * | 5/2019 | Zhang | H04B 1/38 |
| 2019/0238964 | A1 * | 8/2019 | Sax | H04R 1/1091 |
| 2019/0327124 | A1 * | 10/2019 | Lai | G01S 5/017 |
| 2021/0003484 | A1 * | 1/2021 | Wu | G01N 1/14 |
| 2021/0007669 | A1 * | 1/2021 | Jin | A61B 5/7405 |
| 2021/0008331 | A1 * | 1/2021 | Jin | H04R 1/1075 |
| 2021/0029437 | A1 * | 1/2021 | Tseng | H04R 25/656 |
| 2022/0095029 | A1 * | 3/2022 | Zheng | H04R 1/1008 |
| 2022/0303700 | A1 * | 9/2022 | Dominijanni | H04R 25/658 |
| 2022/0337935 | A1 * | 10/2022 | Wang | H04R 3/005 |
| 2023/0007378 | A1 * | 1/2023 | Zhang | H01Q 21/29 |
| 2023/0045445 | A1 * | 2/2023 | Bliss | A44C 7/002 |
| 2023/0082738 | A1 * | 3/2023 | Zheng | H04R 1/1016<br>381/380 |
| 2023/0362525 | A1 * | 11/2023 | Yuan | H04R 21/028 |
| 2024/0039574 | A1 * | 2/2024 | Spar | H04M 1/04 |
| 2024/0305921 | A1 * | 9/2024 | Wu | H04R 5/0335 |
| 2025/0142245 | A1 * | 5/2025 | Wu | H04R 1/1025 |

* cited by examiner

EARPHONE

CROSS REFERENCE OF RELATED APPLICATIONS

The present application claims the priority of Chinese patent application No. 202111115149.0 entitled "Earphone" and filed on Sep. 23, 2021, the entire content of which is incorporated herein by reference.

TECHNICAL FIELD

The present invention relates to the technical field of smart earphone, and in particular, to an earphone.

TECHNICAL BACKGROUND

TWS (True Wireless Stereo) earphone is an advanced wireless earphone developed based on Bluetooth chip technology. TWS earphone works through connection between a cell phone and a main earphone unit of the earphone, and wireless and quick connection between the main earphone unit and an auxiliary earphone unit, thus realizing real separated wireless use of left and right Bluetooth sound channels. TWS earphone completely dispenses with the need for wire connection between conventional earphone units. It is also portable due to small size, greatly facilitating users. Therefore, TWS earphone is gaining in popularity among users.

However, there are still problems in conventional earphones in the prior arts. For example, the in-ear part of existing earphone lacks softness, which is uncomfortable to wear for a long time. Moreover, the size of the in-ear part of the earphone does not fit the structure of ear. For example, the in-ear part of some earphones is too long, so that it will be inserted deeply into the ear, making the earphone uncomfortable to wear. Also, the in-ear part of some other earphones is too short, which is not only easy to fall off, but also results in poor sound quality and poor user experience due to inferior sealing performance.

SUMMARY OF THE INVENTION

In view of the above technical problems, the present invention aims to propose an earphone, which fits the structure of ear to improve the comfortableness when being worn, and further presents enhanced sealing performance, thus ensuring nice sound quality.

The present invention discloses an earphone, which comprises a rear housing, an earpiece housing provided at a front end of the rear housing of the earphone, and a front portion connected to the earpiece housing, wherein the front portion includes a support member and a liquid silicone layer wrapped around an exterior surface of the support member, an end of the liquid silicone layer extending outwardly to form an in-ear part, and a sound transmission channel is formed within the front portion, so that the earpiece housing and the in-ear part are in communication with each other.

In one embodiment, the support member and the liquid silicone layer are manufactured by overmolding, wherein the liquid silicone layer is molded on the exterior surface of the support member, so that the support member and the liquid silicone layer fit together as a whole.

In one embodiment, the liquid silicone layer has a Shore A hardness within a range of 20 to 70.

In one embodiment, the liquid silicone layer has a Shore A hardness within a range of 30 to 45.

In one embodiment, an extension length c of the front portion is configured to be within a range of 14.0 to 20.0 mm.

In one embodiment, a height a of an opening at a front end of the in-ear part is configured to be within a range of 5.5 to 7.5 mm, and a width b of the opening at the front end of the in-ear part is configured to be within a range of 2.5 to 5.0 mm.

In one embodiment, the earphone further comprises a speaker arranged in a main cavity formed together by the earpiece housing and the front portion.

In one embodiment, a distance between the speaker and a front tip end of the front portion is configured to be within a range of 2.0 to 5.0 mm.

In one embodiment, a maximum width h of the main cavity is configured to be within a range of 14 to 20 mm, and a thickness d of the main cavity is configured to be within a range of 7.0 to 12.0 mm.

In one embodiment, a thickness of the support member is configured to be within a range of 0.5 to 0.8 mm.

In one embodiment, a thickness of the liquid silicone layer is configured to be within a range of 0.3 to 3.0 mm.

In one embodiment, a wall thickness of the in-ear part is configured to be within a range of 0.3 to 1.0 mm.

In one embodiment, the support member is provided with clamping studs, and the earpiece housing is provided with clamping slots, wherein each of the clamping studs are configured to fit into a respective one of the clamping slots, so that the support member is connected to the earpiece housing.

In one embodiment, the earphone further comprises a battery provided within the main cavity and on a rear side of the speaker.

In one embodiment, the rear housing comprises a circuit element.

In one embodiment, the circuit element includes a circuit board, on which an audio processor, a Bluetooth chip and a battery management chip are integrated.

Compared with the prior arts, the present invention has the following advantages.

The earphone according to the present invention can fit the structure of the ear, and significantly improve comfort when being worn as well as sealing performance, thereby enhancing the sound quality. The front portion of the earphone is configured to have an ergonomic size, which can fit the structure of the human ear, so that it is more comfortable to put the earphone in the ear. The support member of the earphone can provide a sound rigid support and effectively ensure an appropriate depth of earphone in the ear. The soft liquid silicone layer of the earphone can contribute to comfortable wearing. Meanwhile, the sealing performance between the in-ear part and the ear can be ensured, thereby significantly improving the sound quality. The user of the earphone can readily make adjustments to put the earphone in the ear more comfortably, with optimized sealing performance of the earphone.

BRIEF DESCRIPTION OF THE DRAWINGS

The present invention will be described below with reference to the accompanying drawings.

In the present application, all accompanying drawings are schematic ones, provided to illustrate the principle of the present invention merely, and are not necessarily drawn to actual scale.

DETAILED DESCRIPTION OF EMBODIMENTS

The present invention will be further described below with reference to the accompanying drawings.

Figure 1:
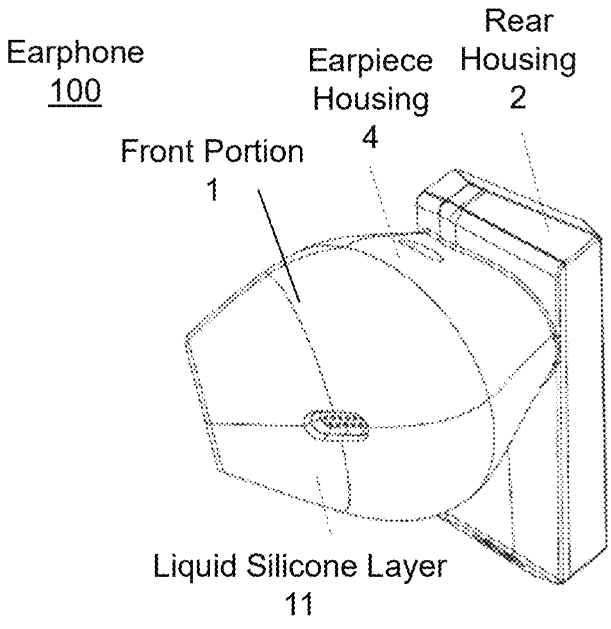
FIG. 1 schematically shows a structure of an earphone according to the present invention.
Figure 3:
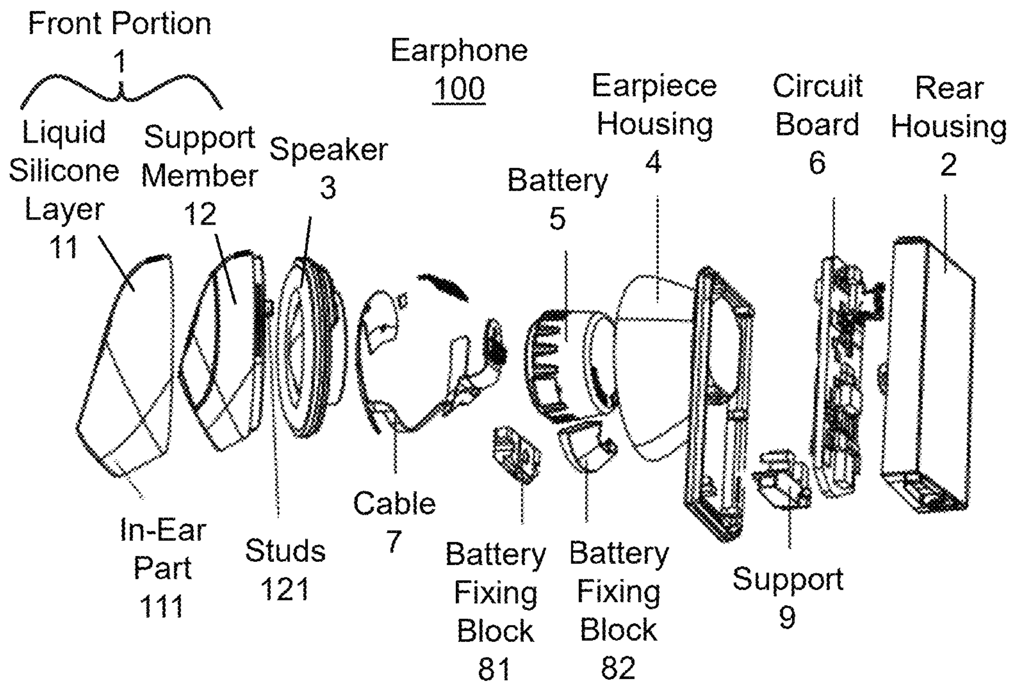
FIG. 3 is an exploded view of the earphone according to the present invention.

FIG. 1 schematically shows an external structure of an earphone according to the present invention. Normally two earphones 100 according to the present invention are used together, namely a right earphone and a left earphone, one of which will be illustrated herein in detail. As shown in FIG. 1, the earphone 100 comprises an earpiece housing 4, and a front portion 1 connected to the earpiece housing 4. The front portion 1 and the earpiece housing 4 together form a main cavity, in which a speaker 3 and an earphone battery 5 (as shown in FIG. 3) are provided. It should be noted that in this context, a side close to the ear when the earphone 100 is put on is defined as "front" side or the like, and a side away from the ear is defined as "rear" side or the like.

As shown in FIG. 3, the earphone battery 5 is provided within the main cavity, on a rear side of the speaker 3. A connecting cable 7 and other electronic components are also installed within the earpiece housing 4. The rear end of the earpiece housing 4 is provided with a rear housing 2 connected thereto. A receiving cavity for installing circuit elements (i.e., other electronic components) is provided within the rear housing 2. The circuit elements include a circuit board 6, wherein module circuits that perform basic functions of the earphone, such as an audio processor, a Bluetooth chip, a battery management chip, and the like, are integrated on the circuit board 6. In one embodiment, the battery 5 may be, for example, a button battery, and is fixed through battery fixing blocks 81 and 82. The circuit board 6 may be fixedly installed within the receiving cavity via a circuit-board installation support 9.

Figure 2:
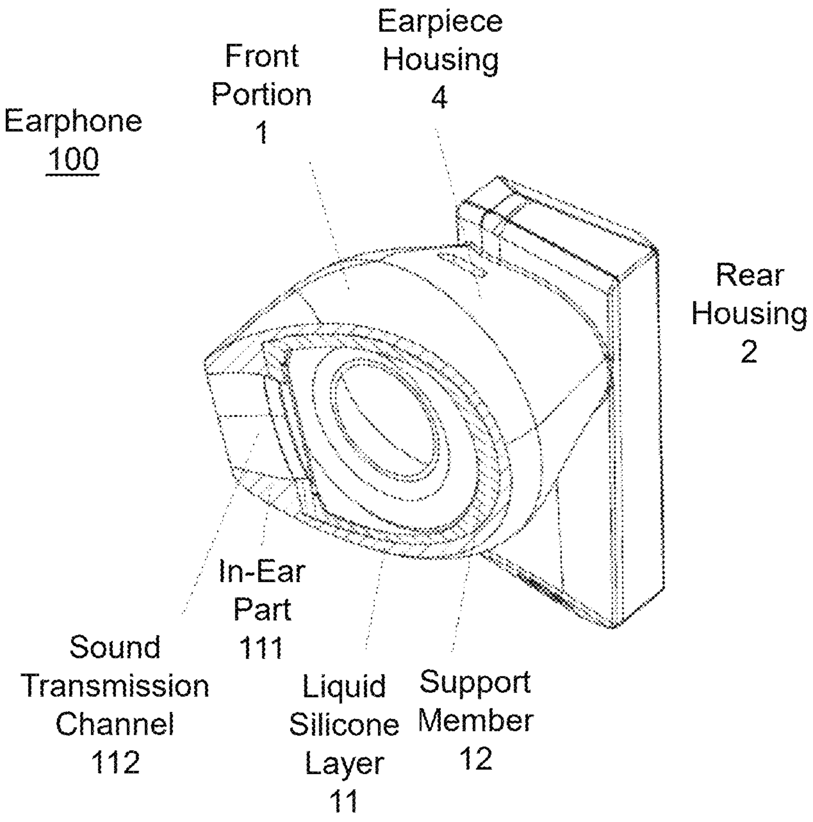
FIG. 2 is a sectional view schematically showing a front portion of the earphone according to the present invention.

As shown in FIGS. 1 and 2, the front portion 1 includes a support member 12, and a flexible liquid silicone layer 11 wrapped around an outer surface of the support member 12. The support member 12 and the liquid silicone layer 11 are formed into one piece, so that the front portion 1 as a whole is connected to the earpiece housing 4. An end of the liquid silicone layer 11 extends outwardly to form an in-ear part 111. A sound transmission channel 112 is formed within the front portion 1, so that the interior space of the earpiece housing 4 and the in-ear part 111 are in communication with each other. The sound information generated by the earphone 100 is transmitted to the in-ear part 111 via the sound transmission channel to enter the user's ear.

The earphone according to the present invention is configured to have an ergonomic shape. According to the present invention, the entire earphone 100 corresponds to an "ear", which includes an internal ear and an external ear. The front portion 1 (including the in-ear part 111), the earpiece housing 4 and the rear housing 2 together form a structure adapted to insert in both the internal ear and the external ear, which is convenient to wear and helps to prevent the earphone from falling off. The in-ear part 111 at the end of the liquid silicone layer 11 of the front portion 1 is configured to fit the structure of human ear canal. The liquid silicone layer 11 has a great degree of softness, making the human ear much more comfortable. In one embodiment, the in-ear part 111 extends outwardly inclining at an angle relative to the earpiece housing 4. The angle of inclination may be within a range of 20 to 40 degrees, preferably about 30 degrees. The external contour of the in-ear part 111 has an elliptical cone structure, which is more suitable for entering the ear canal. In one embodiment, a distance between the speaker 3 and a front tip end of the in-ear part 111 is configured to be within a range of 2.0 to 5.0 mm, preferably 3.0 to 4.5 mm, for example, approximately 3.8 mm.

The liquid silicone layer 11 is configured to have a Shore A hardness within a range of 30 to 70, preferably within a range of 40 to 60, and most preferably within a range of 40 to 55. In another aspect of the present invention, the liquid silicone layer 11 is configured to have a Shore A hardness within a range of 20 to 70, preferably within a range of 25 to 50, and most preferably within a range of 30 to 40. The liquid silicone layer 11 with the hardness within this range ensures not only the durability but also the softness, thus making the ear more the comfortable.

Figure 4:
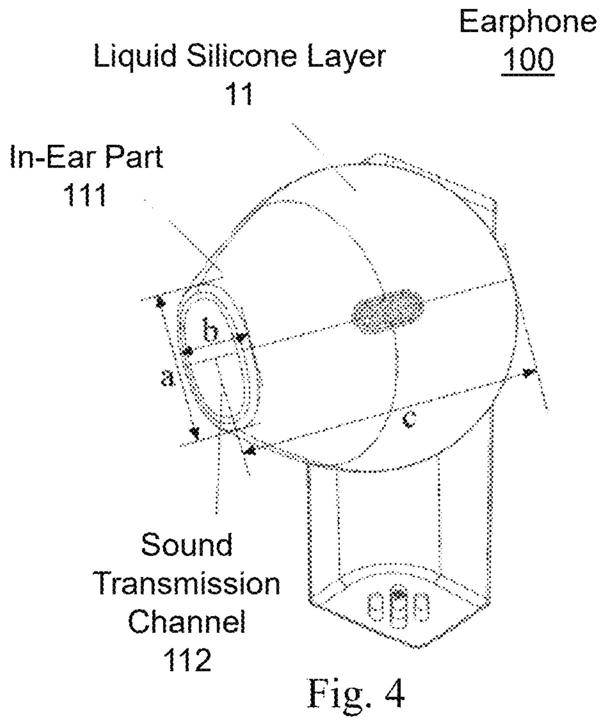
FIG. 4 is a front view schematically showing the earphone according to the present invention.
Figure 5:
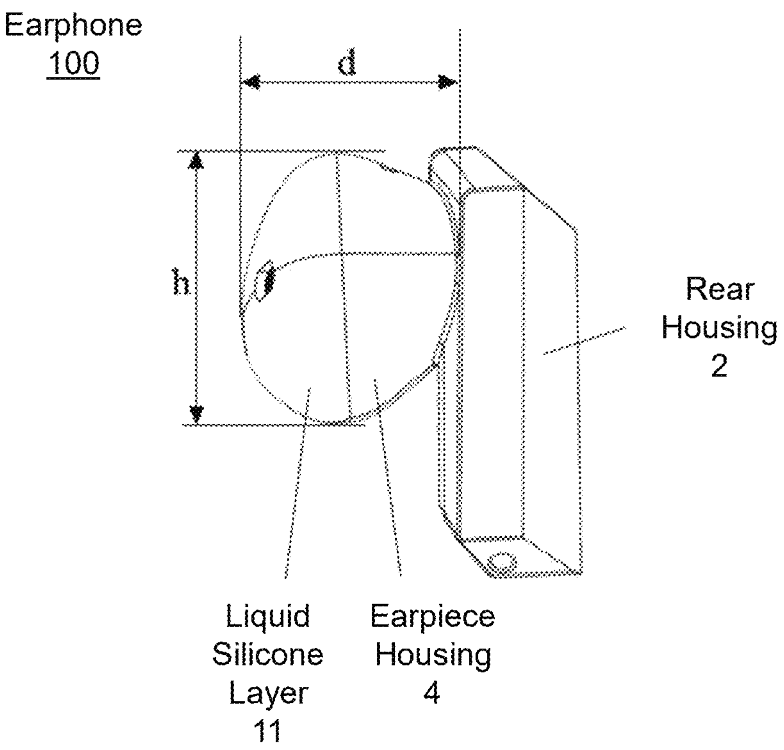
FIG. 5 is a side view schematically showing the earphone according to the present invention.
Figure 6:
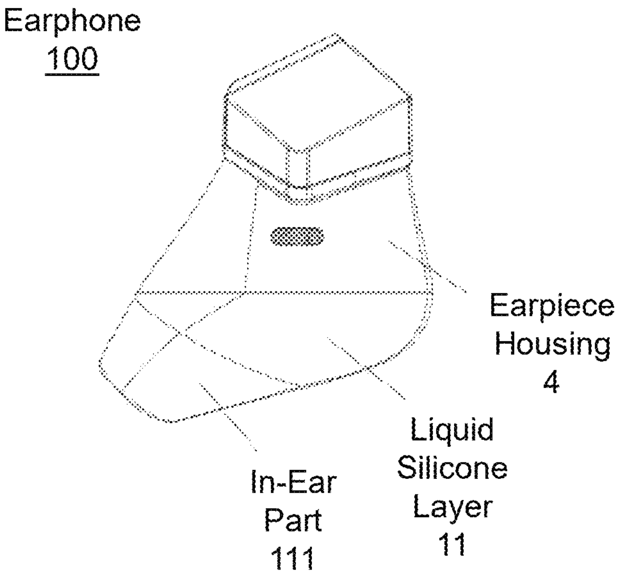
FIG. 6 is a top view schematically showing the earphone according to the present invention.

The earphone 100 according to the present invention is sized ergonomically. As shown in FIG. 4 to FIG. 6, a height a of an opening at a front end of the in-ear part 111 of the front portion 1 is configured to be within a range of 5.5 to 7.5 mm, preferably 6.0 to 7.0 mm, for example, approximately 6.5 mm. A width b of the opening at the front end of the in-ear part 111 is configured to be within a range of 2.5 to 5.0 mm, preferably 3.0 to 4.0 mm, for example, approximately 3.5 mm. An extension length c of the front portion 1 is configured to be within a range of 14.0 to 20.0 mm, preferably 16.0 to 19.0 mm, for example, approximately 18.5 mm. Furthermore, a maximum width h (vertical width) of the main cavity is configured to be within a range of 14 to 20 mm, preferably 15.0 to 19.0 mm, for example, approximately 16.3 mm. It should be noted that the maximum width of the main cavity refers to a maximum dimension of the external contour of the main cavity which is in contact with and supports the human ear pinna. A thickness d of the external contour of the main cavity formed integrally by the front portion 1 and the earpiece housing 4 is configured to be within a range of 7.0 to 12.0 mm, preferably 8.0 to 11.0 mm, for example, approximately 10.0 mm.

The earphone 100 according to the present invention comprises the front portion 1, the shape and size of which can better fit the structure of human ear, so that it is more comfortable to put the earphone in the ear. In addition, an appropriate depth of earphone in the ear can be effectively ensured, thereby improving the comfortableness. Meanwhile, the sealing performance between the in-ear part 111 and the ear canal can be ensured, thereby effectively guaranteeing the sound quality. Therefore, the comfortableness when the earphone is being worn and the optimum sealing performance of the earphone can be achieved. In the present invention, the term "vertical" refers to the vertical direction in FIG. 3.

According to one embodiment of the present invention, as shown in FIG. 6, the support member 12 and the liquid silicone layer 11 are formed by overmolding process. The liquid silicone layer 11 is molded on the outer surface of the support member 12, closely fitting with the support member 12. Thus, the support member 12 and the liquid silicone layer 11 can fit together as a whole, wherein the support member 12 can form a sound rigid support, and the liquid silicone layer 11 can effectively improve comfortableness.

Meanwhile, such an integrally formed structure of the support member 12 and the liquid silicone layer 11 can significantly improve the integrity and effectively ensure the sealing therebetween, thereby avoiding sound leakage and significantly improving the sound quality.

In order to ensure that the support member 12 has sufficient support rigidity, the support member 12 is configured to have a thickness within a range of 0.5 to 0.8 mm, preferably about 0.6 to 0.7 mm.

In order to ensure the softness and resilience of the liquid silicone layer 11, the liquid silicone layer 11 is configured to have a thickness within a range of 0.3 to 3.0 mm, preferably about 0.5 to 2.5 mm. The in-ear part 111 formed by the outwardly-extending end of the liquid silicone layer 11 is configured to have a wall thickness within a range of 0.3 to 1.0 mm, preferably about 0.4 to 0.7 mm.

In this embodiment, the support member 12 and the liquid silicone layer 11 are formed as an integral front portion 1 through overmolding process. The front portion 1 is connected to the earpiece housing 4 to form the whole earphone. The above structure not only effectively ensures the sound rigid support of the front portion 1, but also significantly improves the wearing comfort due to the softness of the liquid silicone layer 11 formed by overmolding. Overmolding, also known as secondary molding, is a molding process commonly used in the art, which can combine a variety of materials into one part or product. In the overmolding process, a rigid plastic base part is generally provided first, and then a flexible external layer of elastic plastic or other material, for example, an external layer of liquid silicone, is covered on the rigid plastic base part. Overmolding may include single (insert molding) or double (multiple molding) techniques. The LSR molding process is also well known in the art, which is sometimes referred to as Liquid Injection Molding (LIM). LIM is generally a thermosetting process, wherein flexible silicone part is manufactured by mixing two compounds and then performing thermal curing by using platinum catalyst in a mold.

In this embodiment, the speaker 3 and the battery 5 are arranged in the main cavity. For example, the speaker 3 is arranged in the cavity of the front portion 1, and the battery 5 is arranged in the cavity of the earpiece housing 4. Alternatively, both the speaker 3 and the battery 5 may be arranged in the cavity of the earpiece housing 4. The TWS earphone comprises a main earphone unit and an auxiliary earphone unit, each provided with an independent power supply (for example, a rechargeable battery which can be charged by an external charger through two contacts).

In the embodiment shown in FIG. 3, the speaker 3 is arranged within the front portion 1. Of course, the speaker 3 may also be arranged in the earpiece housing 4. A distance between the speaker 3 and the front tip end of the front portion 1 is configured to be within a range of 2.0-5.0 mm, preferably 3.0-4.5 mm, for example, about 3.8 mm.

According to another embodiment of the present invention, a first rough interface may be provided on an inner wall of the liquid silicone layer 11, and a second rough interface may be provided on an outer wall of the support member, so that the liquid silicone layer 11 and the support member 12 are connected to each other as a whole through adhesion between the first rough interface and the second rough interface. For example, an adhesive layer (not shown) may be provided between the support member 12 and the liquid silicone layer 11, so that the liquid silicone layer 11 and the support member 12 are adhered to each other as a whole through the adhesive layer. The adhesive layer may be, for example, adhesive glue. In this manner, the adhesive effect between the liquid silicone layer 11 and the support member 12 can be ensured, thereby significantly improving the integrity of the front portion 1 of the earphone.

According to the present invention, an oil-coated layer (not shown) is further provided on an outer surface of the liquid silicone layer 11. For example, a layer of texture-enhancing oil is sprayed on the outer surface of the liquid silicone layer 11, forming the oil-coated layer. The oil-coated layer is not only dust-proof and tactile, but also can further enhance wearing comfort.

In this embodiment, the liquid silicone layer 11 and the support member 12 of the front portion 1 are prepared through one single complete overmolding process, which is illustrated as follows in detail.

First, the support member 12 is prepared through injection molding using PC/ABS, which is a thermoplastic material formed by combining Polycarbonate and polyacrylonitrile (ABS). Thus, the plastic part (namely, the support member 12) is formed through injection molding using the thermoplastic material, with a thickness thereof within a range of 0.5-0.8 mm.

The support member 12 obtained is then placed into a mold (not shown) for overmolding, and liquid silicone is used (for example, LSR97 series, including No. LSR9730A/B and LSR9740A/B, commercially available from Dongguan Tian'an Silicone Technology Co., Ltd.; TYL6420 series, including No. TYL6420-30A/B and TYL6420-40A/B, commercially available from WYNCA TINYO Silicone Co., Ltd.). According to the product specification, a liquid silicone component A and a liquid silicone component B are respectively introduced at a temperature of 120° C.-140° C., and after mixing, the liquid silicone layer 11 which has the shape of earphone housing defined by the mold and surrounds the support member 12 of PC/ABS material is formed in the heating mold. The liquid silicone layer 11 is tightly connected to the support member 12 as a whole. Based on the liquid silicone material and the manufacturing process, the Shore A hardness of the liquid silicone layer formed is within a range of approximately 30~70, for example, approximately 30 or 40, etc.

After the mold is cooled and opened, the crude product formed through overmolding is taken out, and then trimmed and ground. Then, the texture-enhancing oil is sprayed on the surface of the liquid silicone layer 11, so that an oil-coated layer is formed on the surface of the liquid silicone layer 11. Thus, the front portion 1 of the earphone is formed.

In this embodiment, the liquid silicone layer 11 and the support member 12 are integrally formed through the overmolding process, so that the liquid silicone layer 11 can be formed to have a complex interior structure that fits the shape of the support member 12, and an exterior structure that may have various specific shapes that fit the in-ear part of the earphone. Thus, the exterior surface of the liquid silicone layer 11 can be adaptively adjusted according to the shape of the support member 12, thereby greatly facilitating the smaller size of the earphone.

According to the present invention, various liquid silicone rubbers (LSR) known in the art can be used to prepare the liquid silicone layer of the earphone in the present invention. Chemically, liquid silicone rubber is a part of the thermosetting elastomer family, comprising a backbone of alternating silicon and oxygen atoms, and methyl or vinyl pendant groups. Silicone rubber accounts for about thirty percent of silicone family.

The liquid silicone rubber is odorless and tasteless, characterized by wide and suitable hardness range (5 to 90 by hardness tester), inertness, low sensitization, flexibility and durability. Injection molding of the liquid silicone rubber is different from conventional thermoplastic injection molding.

Injection molding of liquid silicone rubber is intended for the manufacture or production of high-volume, flexible and durable components. Liquid silicone rubber is cured silicone with high-purity platinum that has low compression set, excellent stability, and the ability to withstand extreme hot and cold temperatures. It is ideally suitable for the production of key components or devices with high quality, for example, components that come into contact with human body. Due to the thermosetting property of silicone, liquid silicone injection molding requires special treatment, including intensive distribution and mixing, while ensuring that the silicone remains at a low temperature before being injected into a heating chamber or mold and cured.

A typical liquid silicone injection molding machine or system includes a plurality of functional components including an injector, a metering unit, a supply drum, a mixer, a nozzle, at least one mold fixture, and a mold. The injector or injection device is configured to pressurize the liquid silicone, so that the silicone is injected into the mold chamber. The metering unit pumps two major liquid materials, i.e. the base forming the silicone and the catalyst, so as to ensure that the two materials remain at a predetermined constant ratio and are simultaneously released. The supply drum and other containers (e. g., containers for keeping staining material) are connected to the major pumping portion of the system. After the materials exit the metering unit, they are combined together through a static and/or dynamic agitator. Once combined, the mixture is driven into the injection unit through pressure and into a designated mold via an attached nozzle. Typically, the nozzle includes an automatic and/or manual shut-off valve in order to prevent leakage and overfilling of the mold. The mold fixture is used to fix the mold during the injection molding, and open the mold when the injection molding is completed.

As briefly described above, the silicone molding of component or assembly requires that the liquid silicone rubber remains cool prior to being injected into the heating mold. The raw materials used during the molding are usually mixed at a ratio of 1:1 via the static agitator. The curing starts immediately once the materials come into contact with each other. Basically, a mixture mixed at a ratio of 1:1 is pumped to pass through a cold plate and then into a heating chamber, where the curing takes place. The cooling process enables production of liquid silicone rubber assembly with substantially zero waste of material.

According to one embodiment of the present invention, the support member 12 is configured to have a roughly hemispherical shape, and an opening end surface of the support member 12 is configured to connect to the earpiece housing 4. The earpiece housing 4 may, for example, be configured to have a conical shape. A plurality of clamping studs 121 evenly distributed along a circumferential direction may be provided on the opening end surface of the support member 12. At the same time, a plurality of clamping slots (not shown) is correspondingly provided on the opening end surface of the earpiece housing 4. Each of the clamping studs 121 can be fitted into a respective one of the clamping slots for clamping, so that the support member 12 is connected to the earpiece housing 4. Thus, a detachable connection can be formed between the front portion 1 of the earphone and the earpiece housing 4.

The earphone 100 according to the present invention can fit the structure of the ear, and significantly improve comfort when being worn as well as sealing performance, thereby enhancing the sound quality. The front portion 1 of the earphone is configured to have ergonomic shape and size, which can fit the structure of the human ear, so that it is more comfortable to put the earphone in the ear. The support member 12 of the earphone can provide a sound rigid support and effectively ensure an appropriate depth of earphone in the ear. The soft liquid silicone layer 11 of the earphone can contribute to comfortable wearing. Meanwhile, the sealing performance between the in-ear part 111 and the ear can be ensured, thereby significantly improving the sound quality. The user of the earphone 100 can readily make adjustments to put the earphone in the ear more comfortably, with optimized sealing performance of the earphone.

In the present invention, it should be understood that the phrases "first" and "second" are only used for the purpose of illustration, rather than intended to indicate or imply importance or the number of technical features. Thus, the technical feature with the phrases "first" and "second" may explicitly or implicitly include one or more of the technical features. In the present invention, the phrase "a plurality of" means two or more than two, unless otherwise defined.

In the present invention, unless otherwise specified or defined, the phrases "mount", "connect", "attach", "fix" and the like, should be understood in a broad sense, and may be understood as, for example, fixed connections, detachable connections, or integral connections; mechanical or electrical connections; direct connections or indirect connections via intermediate structure; or interior communication between two elements. The specific meanings of the above phrases in the present invention can be understood by one skilled in the art in accordance with specific conditions.

The phrases "an embodiment", "some embodiments", "example", "specific example" or "some examples" as mentioned in the description mean that the particular features, structures, materials or characteristics described in conjunction with the embodiment or example are included in at least one embodiment or example of the present invention. Thus, the above illustrative phrases described throughout the description do not necessarily refer to the same embodiment or example. Moreover, the particular features, structures, materials, or characteristics described herein may be combined in any one or more of the embodiments or examples in a suitable manner.

Finally, it should be noted that the foregoing description is merely illustrative of preferred embodiments of the present invention, and is not intended to restrict the present invention. Although the present invention is described in detail with reference to the above embodiments, it is still possible for one skilled in the art to modify the technical solutions defined in the above embodiments or to replace some of the technical features with equivalent ones. Any modifications, equivalent substitutions, improvements, and the like falling within the spirit and principles of the present invention are intended to be included within the scope of protection of the present invention.

The invention claimed is:

1. An earphone, comprising:
a rear housing;
an earpiece housing provided at a front end of the rear housing of the earphone; and
a front portion connected to the earpiece housing,
wherein the front portion includes a support member and a liquid silicone layer wrapped around an exterior surface of the support member, an end of the liquid silicone layer extending outwardly to form an in-ear part, and a sound transmission channel is formed within the front portion, so that the earpiece housing and the in-ear part are in communication with each other;

wherein the support member and the liquid silicone layer are manufactured by overmolding, wherein the liquid silicone layer is molded on the exterior surface of the support member, so that the support member and the liquid silicone layer are directly in contact with each other without forming any space therebetween;

wherein an extension length c of the front portion is configured to be within a range of 14.0 to 20.0 mm; and wherein a maximum width h of a main cavity formed together by the earpiece housing and the front portion is configured to be within a range of 14 to 20 mm, and a thickness d of the main cavity is configured to be within a range of 7.0 to 12.0 mm.

2. The earphone according to claim 1, wherein the liquid silicone layer has a Shore A hardness within a range of 20 to 70.

3. The earphone according to claim 2, wherein the liquid silicone layer has a Shore A hardness within a range of 30 to 45.

4. The earphone according to claim 1, wherein a height a of an opening at a front end of the in-ear part is configured to be within a range of 5.5 to 7.5 mm, and a width b of the opening at the front end of the in-ear part is configured to be within a range of 2.5 to 5.0 mm.

5. The earphone according to claim 1, wherein the earphone further comprises a speaker arranged in the main cavity formed together by the earpiece housing and the front portion.

6. The earphone according to claim 5, wherein a distance between the speaker and a front tip end of the front portion is configured to be within a range of 2.0 to 5.0 mm.

7. The earphone according to claim 5, wherein the earphone further comprises a battery provided within the main cavity and on a rear side of the speaker.

8. The earphone according to claim 1, wherein a thickness of the support member is configured to be within a range of 0.5 to 0.8 mm.

9. The earphone according to claim 1, wherein a thickness of the liquid silicone layer is configured to be within a range of 0.3 to 3.0 mm.

10. The earphone according to claim 9, wherein a wall thickness of the in-ear part is configured to be within a range of 0.3 to 1.0 mm.

11. The earphone according to claim 1, wherein the support member is provided with clamping studs, and the earpiece housing is provided with clamping slots, wherein each of the clamping studs are configured to fit into a respective one of the clamping slots, so that the support member is connected to the earpiece housing.

12. The earphone according to claim 1, wherein the rear housing comprises a circuit element.

13. The earphone according to claim 12, wherein the circuit element includes a circuit board, on which an audio processor, a Bluetooth chip and a battery management chip are integrated.

* * * * *